(12) United States Patent
Haines et al.

(10) Patent No.: US 11,859,670 B2
(45) Date of Patent: Jan. 2, 2024

(54) TOLERANCE RING

(71) Applicant: SAINT-GOBAIN PERFORMANCE PLASTICS RENCOL LIMITED, Coventry (GB)

(72) Inventors: Paul Haines, Bristol (GB); Andrew R. Slayne, Bristol (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 0 days.

(21) Appl. No.: 17/938,734

(22) Filed: Oct. 7, 2022

(65) Prior Publication Data

US 2023/0030203 A1 Feb. 2, 2023

Related U.S. Application Data

(62) Division of application No. 16/145,270, filed on Sep. 28, 2018, now Pat. No. 11,499,591.

(60) Provisional application No. 62/565,368, filed on Sep. 29, 2017.

(51) Int. Cl.
*F16D 1/08* (2006.01)

(52) U.S. Cl.
CPC .................. *F16D 1/0835* (2013.01)

(58) Field of Classification Search
CPC ........ F16D 1/08; F16D 1/0829; F16D 1/0835; F16D 1/06; F16D 7/02; F16D 7/021; F16D 7/022; Y10T 403/7047; Y10T 403/4058; Y10T 403/7061
See application file for complete search history.

(56) References Cited

U.S. PATENT DOCUMENTS

| | | | |
|---|---|---|---|
| 1,662,544 | A | 3/1928 | Solenberger |
| 1,773,250 | A | 8/1930 | Amberg |
| 2,117,986 | A | 5/1938 | Robertson |
| 2,170,970 | A | 8/1939 | Johnston |
| 2,657,082 | A | 10/1953 | Blackman |

(Continued)

FOREIGN PATENT DOCUMENTS

| | | |
|---|---|---|
| CN | 102177357 A | 9/2011 |
| CN | 104221083 A | 12/2014 |

(Continued)

OTHER PUBLICATIONS

Communication Relating to the Results of the Partial International Search for PCT/EP2018/076385, 11 pages.

*Primary Examiner* — Josh Skroupa
(74) *Attorney, Agent, or Firm* — Abel Schillinger, LLP; Ann Palma

(57) ABSTRACT

An assembly including an outer member; an inner member; and a tolerance ring disposed between the inner member and the outer member, wherein the tolerance ring is a split ring comprising opposing edges, where the edges engaged with at one of the inner member or the outer member so as to prevent or restrict movement between the tolerance ring and at least one of the inner member or the outer member, or where the tolerance ring is deformed as installed between the inner member and the outer member and forms at least one buckled region in the tolerance ring due to an interference fit between the inner member and the outer member, where in an uninstalled state, the buckled region is absent.

19 Claims, 6 Drawing Sheets

(56) References Cited

U.S. PATENT DOCUMENTS

| | | |
|---|---|---|
| 2,886,354 A | 5/1959 | Björklund |
| 3,097,871 A | 7/1963 | Mcnally |
| 3,319,484 A | 5/1967 | Prest |
| 3,348,887 A | 10/1967 | Sheps |
| 3,586,290 A | 6/1971 | Null |
| 3,700,271 A | 10/1972 | Blaurock et al. |
| 3,967,829 A | 7/1976 | Rogers |
| 4,136,982 A | 1/1979 | Sagady |
| 4,195,944 A | 4/1980 | Cross |
| 4,222,246 A | 9/1980 | Rongley |
| 4,250,927 A * | 2/1981 | Newburg .................. F16L 7/00 403/372 |
| 4,286,894 A | 9/1981 | Rongley |
| 4,774,852 A | 10/1988 | Matt |
| 4,790,683 A | 12/1988 | Cramer, Jr. et al. |
| 4,981,390 A | 1/1991 | Cramer, Jr. et al. |
| 5,473,140 A | 12/1995 | Colling |
| 6,261,061 B1 | 7/2001 | Pfaffenberger |
| 6,333,839 B1 | 12/2001 | Misso et al. |
| 6,561,306 B2 | 5/2003 | Watanabe et al. |
| 6,889,956 B2 | 5/2005 | Gutierrez et al. |
| 7,554,771 B2 | 6/2009 | Hanrahan et al. |
| 7,611,303 B2 | 11/2009 | Hanrahan et al. |
| 8,482,882 B2 | 7/2013 | Slayne et al. |
| 8,716,618 B2 | 5/2014 | Gallagher, Sr. et al. |
| 9,028,165 B2 | 5/2015 | Nias et al. |
| 9,145,925 B2 | 9/2015 | Nakamura et al. |
| 9,222,521 B2 * | 12/2015 | Nias ........................ F16D 7/021 |
| 9,869,330 B2 | 1/2018 | Kinoshita et al. |
| 10,087,995 B2 | 10/2018 | Slayne |
| 10,094,426 B2 | 10/2018 | Slayne et al. |
| 10,167,739 B2 | 1/2019 | Benz et al. |
| 10,330,107 B2 | 6/2019 | Groeschel |
| 10,371,213 B2 | 8/2019 | Slayne et al. |
| 10,704,608 B2 | 7/2020 | Nakamura et al. |
| 11,035,418 B2 * | 6/2021 | Nakamura .............. F16D 7/021 |
| 2008/0149450 A1 | 6/2008 | Christoffer et al. |
| 2011/0076096 A1 * | 3/2011 | Slayne .................... F16D 7/021 403/372 |
| 2014/0100070 A1 | 4/2014 | Jung |
| 2014/0362474 A1 | 12/2014 | Araki et al. |
| 2015/0354637 A1 | 12/2015 | Slayne |
| 2016/0084305 A1 * | 3/2016 | Fujita .................... F16D 1/0835 384/291 |
| 2016/0230866 A1 * | 8/2016 | Lingren .................. F16D 7/021 |
| 2019/0101163 A1 | 4/2019 | Haines et al. |

FOREIGN PATENT DOCUMENTS

| | | |
|---|---|---|
| CN | 105026780 A | 11/2015 |
| CN | 105339670 A | 2/2016 |
| CN | 105339691 A | 2/2016 |
| CN | 105545974 A | 5/2016 |
| CN | 106460935 A | 2/2017 |
| DE | 834477 C | 3/1952 |
| DE | 3314909 A1 | 10/1984 |
| EP | 0234398 A2 | 9/1987 |
| EP | 1106474 A2 | 6/2001 |
| EP | 1724057 A2 | 11/2006 |
| JP | 62199908 A | 9/1987 |
| JP | 2001163229 A | 6/2001 |
| JP | 2013505411 A | 2/2013 |
| JP | 2017516960 A | 6/2017 |
| KR | 1020120065415 A | 6/2012 |
| WO | 9943927 A1 | 9/1999 |
| WO | 2013095495 A1 | 6/2013 |
| WO | 2013100153 A1 | 7/2013 |
| WO | 2014207219 A1 | 12/2014 |
| WO | 2016049181 A1 | 3/2016 |
| WO | 2017026273 A1 | 2/2017 |
| WO | 2019063752 A2 | 4/2019 |

* cited by examiner

TOLERANCE RING

CROSS-REFERENCE TO RELATED APPLICATION(S)

This application is a divisional of and claims priority under 35 U.S.C. § 120 to U.S. patent application Ser. No. 16/145,270, entitled "TOLERANCE RING," by Paul HAINES et al., filed Sep. 28, 2018, which claims priority under 35 U.S.C. § 119(e) to U.S. Provisional Patent Application No. 62/565,368, entitled "TOLERANCE RING", by Paul HAINES et al., filed Sep. 29, 2017, both of which are assigned to the current assignee hereof and incorporated herein by reference in their entireties.

FIELD OF THE DISCLOSURE

The present disclosure relates to tolerance rings, and more particularly to tolerance rings installed between components.

RELATED ART

A tolerance ring may be disposed in a radial gap formed between an inner component or inner member, e.g., a shaft, and an outer component or outer member, e.g., a bore formed in a housing in an assembly or mechanism. The tolerance ring can act as a force limiter to permit torque to be transmitted between the inner and outer members. The use of a tolerance ring can accommodate variations in the diameter of the inner and outer members while maintaining interconnection therebetween.

Typically, a tolerance ring comprises a band of resilient material, e.g. a metal, the ends of which are brought towards one another to form an annular ring. Tolerance rings usually comprise a strip of resilient material that is curved to allow the easy formation of a ring; a tolerance ring may also be manufactured as an annular band.

Projections are typically stamped into the band of resilient material. The projections can span the radial gap between the inner and outer member and transmit forces therebetween. Typically, tolerance rings are required to provide overload protection device within very precise, predetermined torque values to protect an assembly or mechanism from damage. Therefore, there continues to exist a need for tolerance rings adapted to be used in applications with tight torque ranges between the inner and outer members.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application. Reference to ranges The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the tolerance ring arts.

Figure 1A:
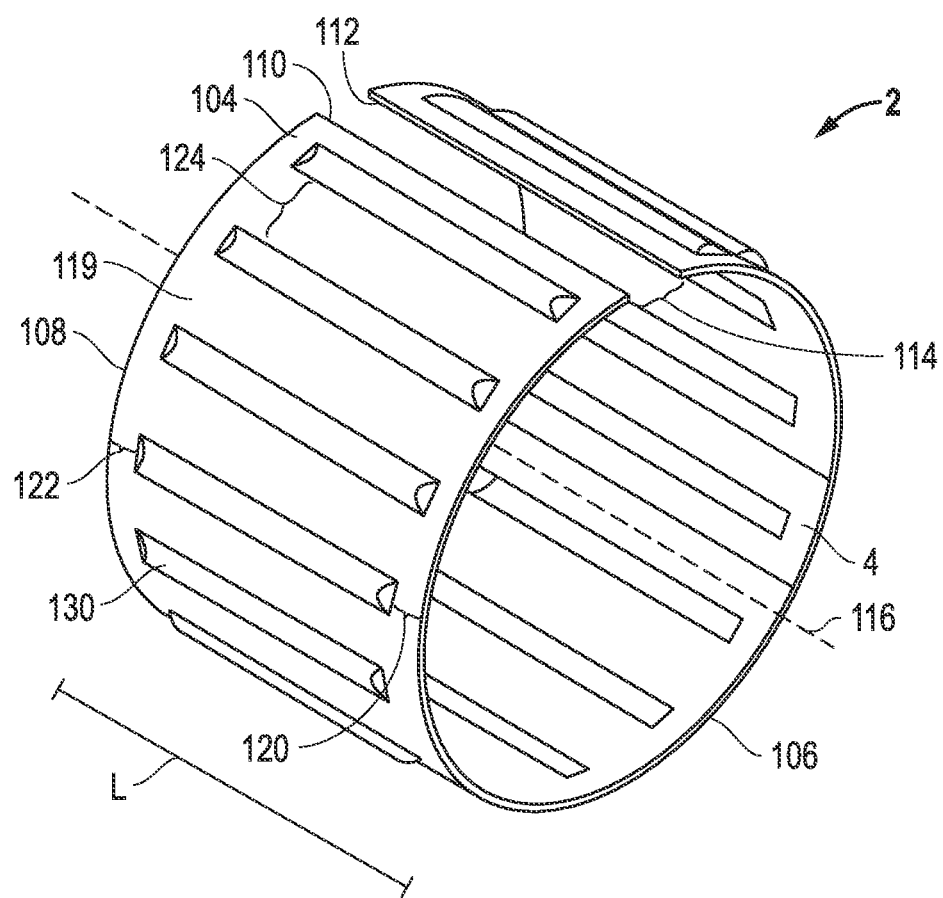
FIG. 1A includes a top view of an assembly including a tolerance ring in accordance with an embodiment.
Figure 1B:
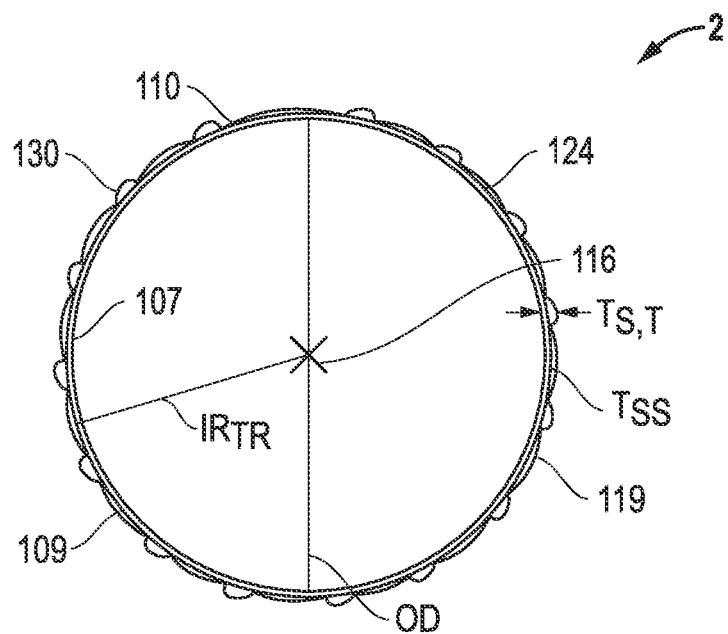
FIG. 1B includes a cross-sectional view of a tolerance ring in accordance with the first embodiment.

Referring now to FIGS. 1A and 1B, a tolerance ring is illustrated and is generally designated 2. As depicted in FIG. 1A, the tolerance ring 2 can include a body 4 having a generally cylindrical undeformed sidewall 104. The sidewall 104 can include a top 106 located at a first axial end and a bottom 108 located at a second axial end, opposite to the first axial end. As depicted in FIG. 1B, the sidewall 104 can include an inner side 107 located at a first radial side and an outer side 109 located at a second radial side, opposite to the first radial side. Further, in a number of embodiments, the sidewall 104 can include a first end or edge 110 and a second end or edge 112. Moreover, a gap 114 can be established between the first end 110 and the second end 112 of the sidewall 104. The gap 114 can extend completely through the sidewall 104 in order to form a split in the sidewall 104 of the tolerance ring 100. As illustrated in FIG. 1B, the tolerance ring 2 may not contain a split and be a closed loop tube or cylinder. As illustrated in FIG. 1A-1B, the tolerance ring 100 can include a center axis 116.

In a number of embodiments, the tolerance ring 2 can have a thickness, T, and T can be ≥0.1 mm, such as ≥0.2 mm, ≥0.3 mm, ≥0.4 mm, ≥0.5 mm, or ≥0.6 mm. In another aspect, T can be ≤1.0 mm, ≤0.9 mm, or ≤0.8 mm.

In a number of embodiments, the tolerance ring 2 may have an overall outer diameter, OD, and OD can be ≥1 mm, such as ≥10 mm, ≥20 mm, ≥30 mm, ≥40 mm, or ≥50 mm. The OD can be ≤100 mm, such as ≤50 mm, or ≤25 mm.

In a number of embodiments, the tolerance ring can have an overall length, L from first axial end 106 to the second axial end 108, and L can be ≥1 mm, ≥5 mm, ≥10 mm, ≥25 mm, or ≥50 mm. L can be ≤75 mm, such as ≤50 mm, ≤25 mm, ≤10 mm, or ≤5 mm.

The sidewall 104 of the tolerance ring 100 can include at least one intermediate region 119. The sidewall 104 of the tolerance ring 100 can include an upper intermediate region 120 near, or adjacent to, the top 106 of the sidewall 104. The sidewall 104 can also include at least one lower intermediate region 122 near, or adjacent to, the bottom 108 of the sidewall 104 opposite the at least one upper intermediate region 120. Further, central intermediate regions 124 can extend axially along the length of the sidewall 104 between, and extending from, the upper and lower intermediate regions 120 and 122. In a number of embodiments, the intermediate region 119 (including the upper intermediate region 120, lower intermediate region 122, and/or the central intermediate region 124) may include a contoured or sloped shape. In a number of embodiments, the intermediate region 119 (including the upper intermediate region 120, lower intermediate region 122, and/or the central intermediate region 124) may include an unformed shape.

Figure 2:
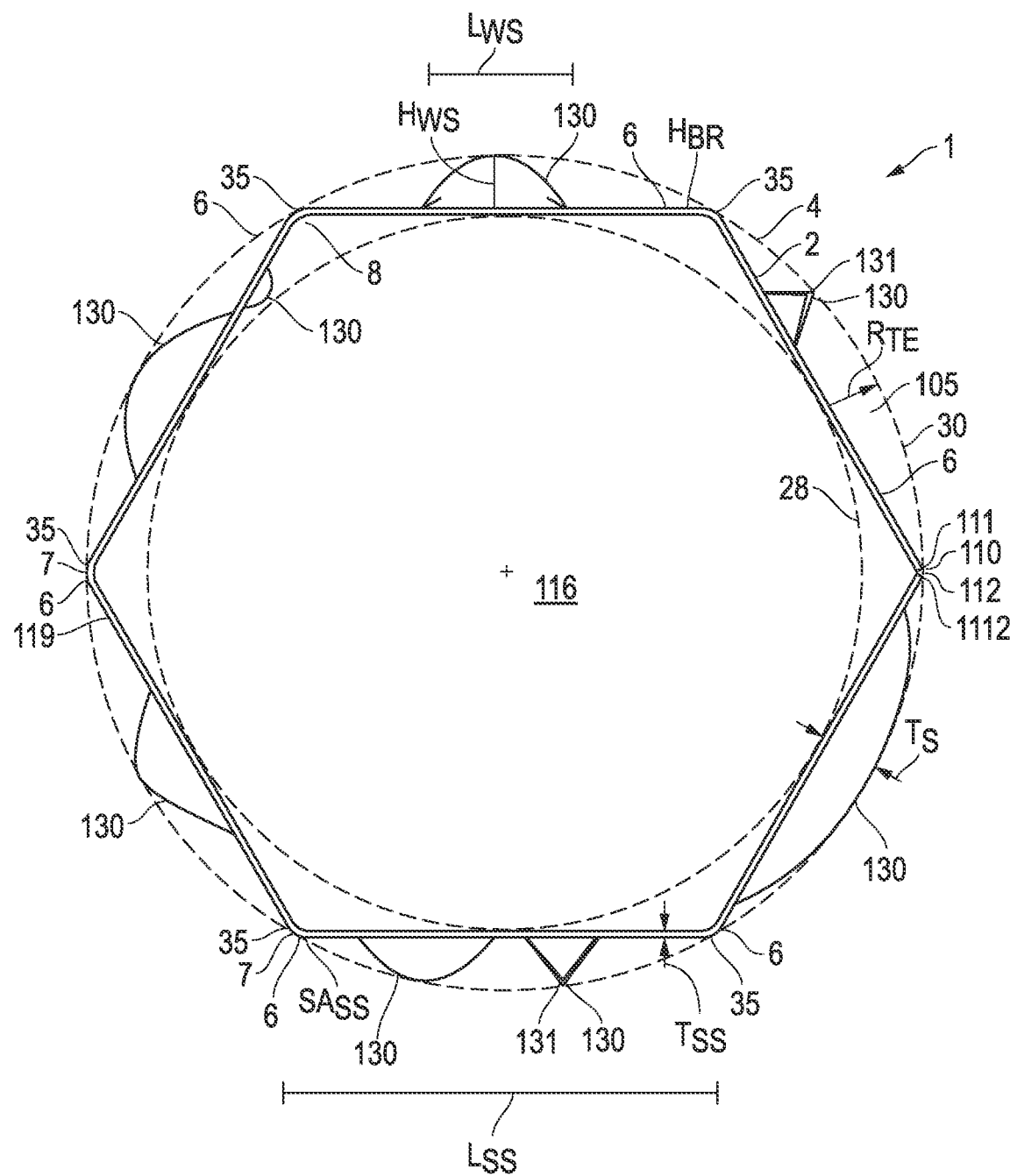
FIG. 2 includes a top view of a tolerance ring within an assembly in accordance with an embodiment.
Figure 3:
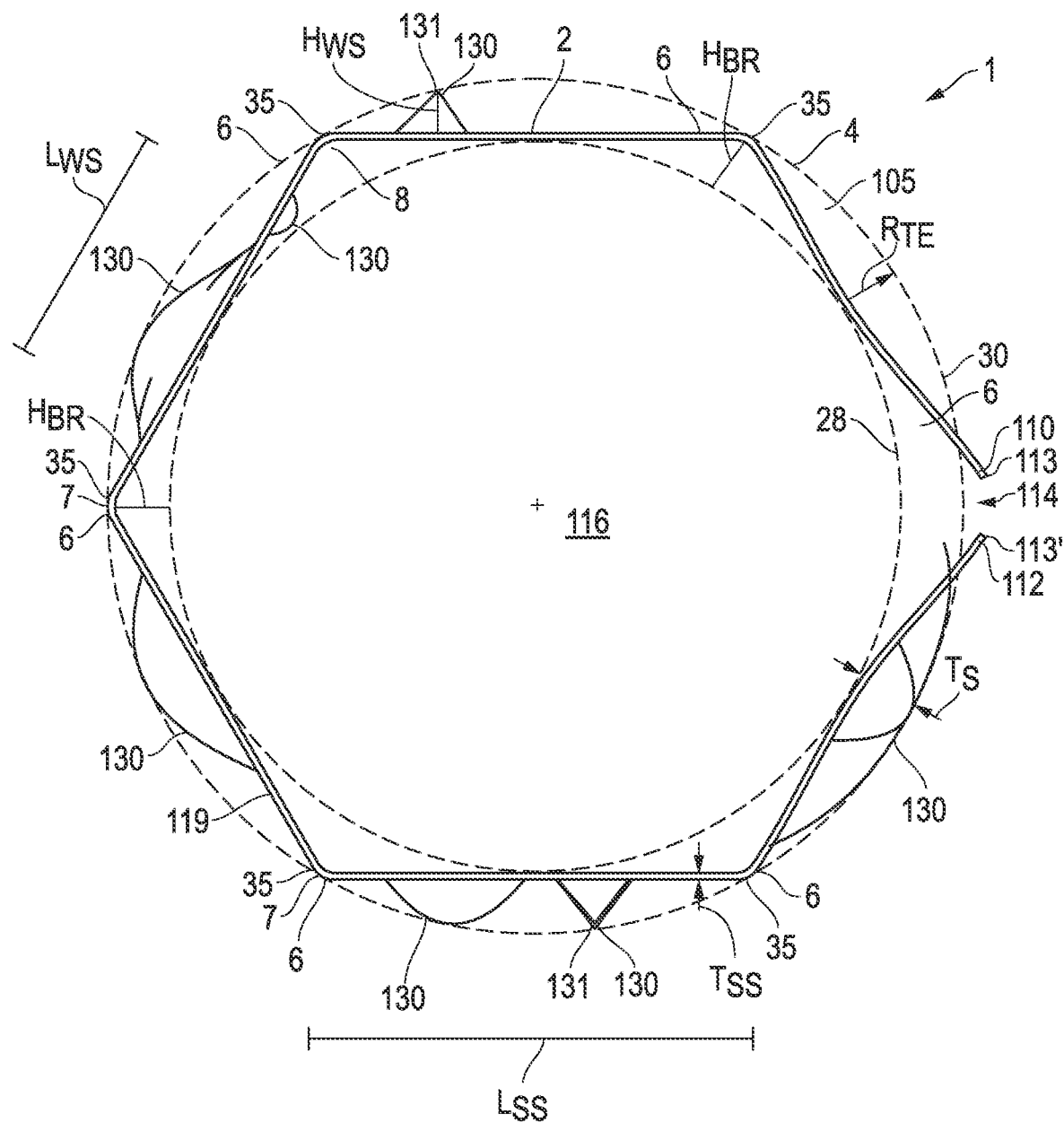
FIG. 3 includes a top view of a tolerance ring within an assembly in accordance with an embodiment.

As illustrated in FIGS. 1A and 1B, the tolerance ring 100 can include a plurality of wave structure regions 130 comprising wave structures formed in the sidewall 104. The wave structure regions 130 can protrude radially outward, or inward, from the sidewall 104 away from, or toward, the central axis 116 of the tolerance ring 100. In a number of embodiments, the wave structure or wave structure region 130 may have a polygonal, oval, circular, semi-circular, or substantially circular, or pointed, cross-section and may coincide with the shape. In certain embodiments, the wave structure or wave structure region 130 may have a triangular cross-section shape with a pointed apex 131, as shown in FIGS. 2-3. In a number of embodiments, the wave structure or wave structure region 130 can comprise a regular polygon, that is, the wave structure or wave structure region 130 can be a polygon that may be both equiangular and equilateral.

Each wave structure region 130 may be connected only to the intermediate region 124 such that the portion near the intermediate bands 120 and 122 of wave structures 130 may be open. In another embodiment, the wave structure region 130 may be connected to the undeformed region 124 and the undeformed bands 120 and 122 such that they may be closed. As shown in FIG. 1B, each intermediate region 124 may be located between adjacent wave structure regions 130 and each wave structure region 130 may be located between adjacent formed regions 124 so the wave structure regions 130 and intermediate regions 124 alternate around a circumference of the sidewall 104.

As depicted in FIG. 1A, the tolerance ring 100 can include one row, or band, of wave structures. In other embodiments (not shown), the tolerance ring can include two rows, or bands, of wave structures; three rows, or bands, of wave structures; etc. Further, a total number of wave structures or wave structure regions, $N_{WS}$, in each row can be ≥3, such as ≥4, ≥5, ≥6, ≥7, ≥8, or ≥9. Further, $N_{WS}$≤30, ≤25, ≤20, or ≤15. $N_{WS}$ can be within a range between and including any of the $N_{WS}$ values above. In a particular embodiment, as shown in FIGS. 1A and 1B, $N_{WS}$ can be 15.

Figure 9:
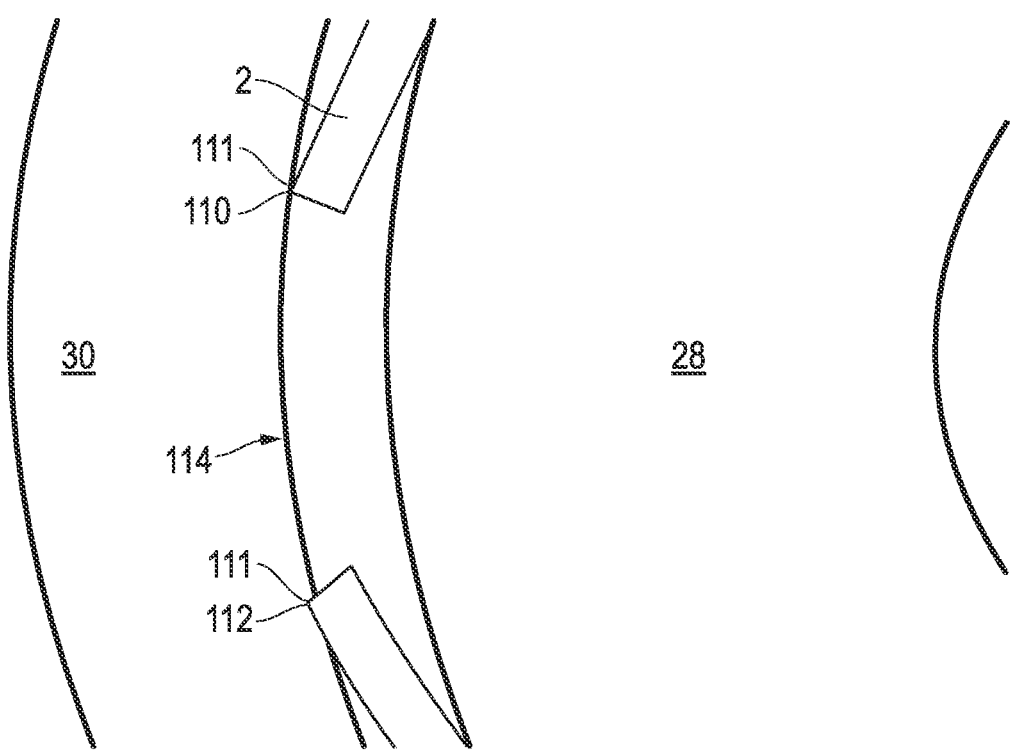
FIG. 9 includes a close-up of a top view of a tolerance ring within an assembly in accordance with an embodiment.

Referring now to FIGS. 2-3, in a number of embodiments, a tolerance ring 2 in accordance with one or more of the embodiments described herein can be disposed between an inner member 28 (such as a shaft) and an outer member 30 (such as a housing) along the central axis 116 to form an assembly 1 with the tolerance ring in an installed state. The inner component 28 and outer component 30 may each be formed from a material including a metal, a polymer, or other similar material known in the art. As shown in FIGS. 2-3 and 9-10, in a number of embodiments, at least one of the opposing first and second edges 110, 112 of the tolerance ring 2 may engage and/or contact the outer member 30. In a number of embodiments, at least one of the first or second edges 110, 112 may be engaged with the outer member 30 so as to prevent or restrict relative movement between the tolerance ring 2 and the outer member 30. The movement may be prevented or restricted in a rotational, axial, or radial direction with respect to the central axis 116. According to a particular embodiment, relative radial movement is prevented. As shown in FIGS. 2 and 9-10, in a number of embodiments, at least one of the opposing first and second edges 110, 112 of the tolerance ring 2 may form an interlock with at least one of the inner member 28 or the outer member 30. In a number of embodiments, the interlock may be a corner 111 of at least one of the edges 110, 112 contacting at least one of the inner member 28 or the outer member 30. In a number of embodiments, as shown in FIG. 3, at least one of the opposing first and second edges 110, 112 of the tolerance ring 2 may be keyed to at least one of the inner member 28 or the outer member 30 through matching or otherwise corresponding grooves 113, 113' found in the inner member 28 or outer member 30. In a number of variations, the grooves 113, 113' may have a polygonal, oval, circular, semi-circular, or substantially circular cross-section and may coincide with the shape of at least one of the first or second edges 110, 112 to form an interference fit preventing or restricting the relative movement of the tolerance ring 2 with at least one of the inner member 28 or outer member 30.

Referring still to FIGS. 2-3, in a number of embodiments, the tolerance ring 2 may be deformed as installed between the inner member 28 and the outer member 30 such that it forms a plurality of sidewall segments 6 in the sidewall 104 when installed in the assembly 1. In a number of embodiments, these sidewall segments 6 may include at least one buckled region 35 which may be deformed as installed in the assembly 1 due to an interference fit between the inner member 28 and the outer member 30. In an uninstalled state, the buckled region 35 may be non-planar as shown in FIGS. 1A-1B. During assembly or use, a portion of the buckled region 35 may be generally planar in an installed state. In a number of embodiments, the buckled region may contact at least one of the inner member 28 or the outer member 30. In a number of embodiments, the buckled region may be adapted to form one point of contact with the outer component 30 and two points of contact with the inner component 28. This buckled region 35 may be absent in the uninstalled state of the tolerance ring 2 (i.e. before the tolerance ring 2 may be disposed between the inner member 28 and the outer member 30), as shown in FIGS. 1A-1B. The buckled region 35 may be at least partially elastically formed, such that upon disassembly from the inner member 28 and the outer member 30 the buckled region 35 at least partially collapses. As shown in FIGS. 2-3, the buckled region 35 may have a buckled region height $H_{BR}$, where upon disassembly, the buckled region height $H_{BR}$ may be reduced by no greater than 80%, such as no greater than 70%, such as no greater than 60%, such as no greater than 50%, such as no greater than 40%, such as no greater than 30%, such as no greater than 20%, such as no greater than 10%, or such as no greater than 5%. The height $H_{BR}$ of the buckled region 35 may be the same slope or contour as the intermediate region 119.

Upon assembly, at least one of the buckled regions 35 can operate in an elastic zone of deformation, i.e., at least one of the buckled regions 35 can be capable of deforming upon application of a force and returning to its original shape after removal of the force. It may be possible, by including buckled regions 35 of different deformation characteristics, to yet further alter the characteristics of the tolerance ring 2, e.g., stiffness, sliding capability, or tolerance absorption.

In a number of embodiments, as shown in FIGS. 2-3, the buckled regions 35 may be formed from at least one of the intermediate regions 119 (120, 122, 124) during assembly and use of the tolerance ring 2 between the inner member 28 and outer member 30 in an installed state. By non-limiting example. A buckled region 35 may be formed when installed between the inner member 28 and outer member 30, or during application of force (e.g. rotational force, axial force, or radial force) to at least one of the inner member 28 or outer member 30.

In a number of embodiments, as installed within the assembly 1, sidewall segments 6 may form or otherwise include the buckled regions 25 of the tolerance ring 1 with each buckled region 25 forming an apex, plateau, or ridge 7 that contacts the inner member 28 or outer member 30. In a number of embodiments, as installed within the assembly 1, sidewall segments 6 may form or otherwise include the buckled regions 25 of the tolerance ring 1 with each buckled region 25 forming an apex, plateau, or ridge 7 that does not contact the inner member 28 or outer member 30. In a number of embodiments, the apex 7 may be rounded. In a number of embodiments, the apex 7 may be pointed. In a number of embodiments, the buckled regions 25 buckled during installation or use of the tolerance ring 2 within the assembly 1 may form the sidewall segments 6. The sidewall segments 6 may be between the wave structure regions 130, or may include at least a part of one wave structure region 130. In a number of embodiments, at least 65% of each sidewall segment 6 can lie along a plane, such as at least 70% of each sidewall segment, at least 75% of each sidewall segment, at least 80% of each sidewall segment, at least 85% of each sidewall segment, at least 90% of each sidewall segment, or even at least 95% of each sidewall segment 6 can lie along a plane.

In a number of embodiments, each sidewall segment 6 can define a thickness ($T_{SS}$) and a height ($H_{SS}$). In certain embodiments, an aspect ratio, as measured by a ratio of the height of the sidewall segment 6 to the thickness of the sidewall segment 6, can be no less than 1.5:1. In a certain embodiment, the buckled regions 35 can include at least 3 sidewall segments, such as at least 4 sidewall segments, at least 5 sidewall segments, at least 6 sidewall segments, at least 7 sidewall segments, at least 8 sidewall segments, at least 9 sidewall segments, at least 10 sidewall segments, at least 15 sidewall segments, or even at least 20 sidewall segments. In a further embodiment, the tolerance ring can include no greater than 75 sidewall segments, such as no greater than 50 sidewall segments, or even no greater than 25 sidewall segments. In this regard, when viewed from a top view, such as illustrated in FIGS. 2-3, the tolerance ring 2 can define a polygon, such as, for example, a triangle, a quadrilateral, a pentagon, a hexagon, a heptagon, an octagon, a nonagon, a decagon, etc.

After reading this specification, a person of ordinary skill in the art will understand that the number of sidewall segments 6 including the buckled regions 35 of the tolerance ring 2 may depend on a thickness of a radial gap 105 formed between an inner member and an outer member of an assembly. For example, as explained in greater detail below, assemblies 1 having a large radial gap 105 may utilize less sidewall segments 6 as compared to assemblies 1 having a small radial gap 105, where more sidewall segments 6 may be required.

Figure 4:
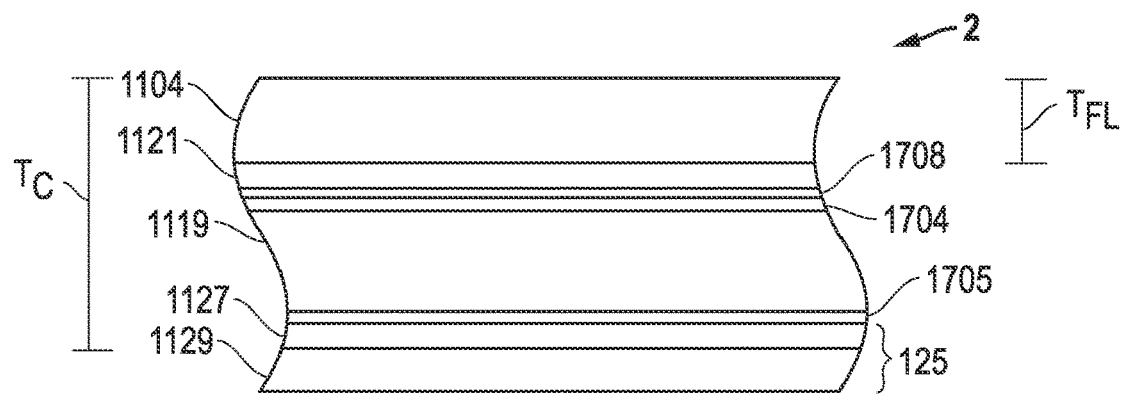
FIG. 4 includes a cross-sectional view of a surface of a tolerance ring in accordance with an embodiment.

In a number of embodiments, as shown in FIG. 4, the tolerance ring 2 can include a composite material. In a number of embodiments, the tolerance ring 2 may include a substrate or metal strip 1119 and a low friction layer 1104. The low friction layer 1104 can be coupled to at least a portion of the metal strip 1119. In a particular embodiment, the low friction layer 1104 can be coupled to a surface of the metal strip 1119 so as to form a low friction interface with another surface of another component. In a particular embodiment, the low friction layer 1104 can be coupled to the radially inner surface of the metal strip 1119 so as to form a low friction interface with another surface of another component. In a particular embodiment, the low friction layer 1104 can be coupled to the radially outer surface of the metal strip 1119 so as to form a low friction interface with another surface of another component (such as the inner member 28 or outer member 30).

In an embodiment, the metal strip 1119 can at least partially include a metal. The metal may include aluminum, zinc, copper, magnesium, tin, platinum, titanium, tungsten, lead, iron, bronze, alloys thereof, or may be another type. More particularly, the substrate can at least partially include a steel, such as a stainless steel or spring steel. For example, the substrate can at least partially include a 301 stainless steel. The 301 stainless steel may be annealed, ¼ hard, ½ hard, ¾ hard, or full hard. The metal strip 1119 may include a woven mesh or an expanded metal grid. Alternatively, the woven mesh can be a woven polymer mesh. In an alternate embodiment, the metal strip 1119 may not include a mesh or grid. In another alternate embodiment, the metal strip 1119, as a solid component, woven mesh or expanded metal grid, may be embedded between at least one adhesive layer 1121 included between the low friction layer 1104 and the metal strip 1119. In at least one embodiment, the metal strip 1119 may be any kind of metal alloy which provides an elastic behavior under application load in an arcuate shape.

Optionally, the tolerance ring 2 may include at least one adhesive layer 1121 that may couple the low friction layer 1103 to the metal strip 1119. The adhesive layer 1121 may include any known adhesive material common to the ring arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C═O, —C—O—R, —COH, —COOH, —COOR, —CF$_2$═CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 1121 can have a thickness of about 1 to 50 microns, such as about 7 to 15 microns.

Optionally, the metal strip 1119 may be coated with corrosion protection layers 1704 and 1705 to prevent corrosion of the tolerance ring 2 prior to processing. Additionally, a corrosion protection layer 1708 can be applied over layer 1704. Each of layers 1704, 1705, and 1708 can have a thickness of about 1 to 50 microns, such as about 7 to 15 microns. Layers 1704 and 1705 can include a phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1706, and 1708 can be removed or retained during processing.

Optionally, the tolerance ring 2 may further include a corrosion resistant coating 1125. The corrosion resistant coating 1125 can have a thickness of about 1 to 50 microns, such as about 5 to 20 microns, and such as about 7 to 15 microns. The corrosion resistant coating can include an adhesion promoter layer 127 and an epoxy layer 129. The adhesion promoter layer 1127 can include a phosphate of zinc, iron, manganese, tin, or any combination thereof, or a nano-ceramic layer. The adhesion promoter layer 1127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 1129 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C═O—O—C═O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In a number of embodiments, the low friction layer 1104 can comprise materials including, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. In an example, the low friction layer 1104 includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the low friction/wear resistant layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction/wear resistant layer includes polyketone, such as polyether ether ketone (PEEK), polyether ketone, polyether ketone ketone, polyether ketone ether ketone, a derivative thereof, or a combination thereof. In an additional example, the low friction/wear resistant layer may be an ultra high molecular weight polyethylene. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The low friction layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, lead, iron, bronze, steel, spring steel, stainless steel), a metal alloy (including the metals listed), an anodized metal (including the metals listed) or any combination thereof. Fluoropolymers may be used according to particular embodiments. As used herein, a "low friction material" can be a material having a dry static coefficient of friction as measured against steel of less than 0.5, such as less than 0.4, less than 0.3, or even less than 0.2. A "high friction material" can be a material having a dry static coefficient of friction as measured against steel of greater than 0.6, such as greater than 0.7, greater than 0.8, greater than 0.9, or even greater than 1.0.

In a number of embodiments, the low friction layer 1104 may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitride, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof.

In an embodiment, the low friction layer 1104 can have a thickness $T_{FL}$ in a range of 0.01 mm and 0.4 mm, such as in a range of 0.15 mm and 0.35 mm, or even in a range of 0.2 mm and 0.3 mm. In an embodiment, the thickness of the low friction 1104 may be uniform, i.e., a thickness at a first location of the low friction layer 1104 can be equal to a thickness at a second location therealong. In an embodiment, the tolerance ring 2 may include a metal strip 1119, which may be formed with the low friction layer 1104 at the outer side 109 of the sidewall 104. In an embodiment, the tolerance ring 2 may include a metal strip 1119, may be formed with the low friction layer 1104 on the inner side 107 of the sidewall 104. In a number of embodiments, the metal strip 1119 may extend at least partially along a length of the tolerance ring 2. The metal strip 1119 may be at least partially encapsulated by the low friction or low friction layer 1104. That is, the low friction or low friction layer 1104 may cover at least a portion of the metal strip 1119. Axial ends of the metal strip 1119 may or may not be exposed from the low friction or low friction layer 1104. In a particular embodiment, the metal strip 1119 may be fully encapsulated in the low friction or low friction layer 1104 such that the metal strip 1119 may not be visibly perceptible. In another embodiment, the metal strip 1119 may include an aperture extending at least partially into the low friction or low friction layer 1104. The aperture can generally reduce stiffness of the tolerance ring 2, thereby allowing a specific engineered stiffness profile.

In an embodiment, any of the layers on the tolerance ring 2, as described above, can each be disposed in a roll and peeled therefrom to join together under pressure, at elevated temperatures (hot or cold pressed or rolled), by an adhesive, or by any combination thereof. In a number of embodiments, any of the layers of the tolerance ring 2, as described above, may be laminated together such that they at least partially overlap one another. In a number of embodiments, any of the layers on the tolerance ring 2, as described above, may be applied together using coating technique, such as, for example, physical or vapor deposition, spraying, plating, powder coating, or through other chemical or electrochemical techniques. In a particular embodiment, the low friction layer 1104 may be applied by a roll-to-roll coating process, including for example, extrusion coating. The low friction layer 1104 may be heated to a molten or semi-molten state and extruded through a slot die onto a major surface of the metal strip 1119. In another embodiment, the low friction layer 1104 may be cast or molded.

In other embodiments, any of the layers on the tolerance ring 2, as described above, may be applied by a coating technique, such as, for example, physical or vapor deposition, spraying, plating, powder coating, or through other chemical or electrochemical techniques. In a particular embodiment, the low friction layer 1104 may be applied by a roll-to-roll coating process, including for example, extrusion coating. The low friction layer 1104 may be heated to a molten or semi-molten state and extruded through a slot die onto a major surface of the substrate or metal strip 1119. In another embodiment, the low friction layer 1104 may be cast or molded.

By way of a non-limiting example, the tolerance ring 2 can be shaped in a jig. As stated above, in this regard, a strip of resilient material can be bent on the jig at desired locations to form bent portions. The strip of resilient material can comprise the substrate 1119 including a metal (such as aluminum, zinc, copper, magnesium, tin, platinum, titanium, tungsten, lead, iron, bronze, steel, spring steel, stainless steel), a metal alloy (including the metals listed), an anodized metal (including the metals listed) or any combination thereof. In a non-limiting embodiment, the strip of resilient material can additionally, or alternatively, include a low friction layer 1104 including a polymer, or a polymer coating disposed on the resilient material or substrate. In a number of embodiments, alternative materials can be used along the circumference of the tolerance ring 2. In other words, the buckled regions 35, the intermediate regions 119, and the wave structure regions 130 may each comprise different materials or compositions of the materials listed above at various locations circumferentially, radially, or axially about the tolerance ring 2.

In a particular embodiment, as stated above, the tolerance ring 2 can further define a circumferential gap 114 disposed between circumferential ends of the tolerance ring 2. The circumferential gap 114 can extend the entire axial length of the tolerance ring 2 so as to form a split tolerance ring 2. In certain applications, the circumferential gap 114 can be welded together at one or more locations along the circumferential ends of the tolerance ring 2. The weld(s) can be permanent or temporary. A temporary weld may be utilized during transportation of the tolerance rings 2 in order to prevent entanglement of the tolerance rings. Alternatively, the weld can be permanent so as to form a closed tolerance ring. Alternatively, the tolerance ring may have no gap at all either through welding or through forming without one, such as shown in FIG. 1B.

In a number of embodiments, in an installed state, sidewall segments 6 of the buckled regions 35 can meet at angles, A at the apex 7 of the buckled region 35 (illustrated in FIGS. 2-3 at 8). In a particular embodiment, each angle 8 can be no less than 60°, such as no less than 90°, no less than 120°, or even no less than 150°. In a further embodiment, each angle 8 can be less than 180°, such as no greater than 170°, no greater than 160°, no greater than 150°, no greater than 140°, no greater than 130°, no greater than 120°, or even no greater than 110°. In a particular embodiment, the angles 8 can all lie along straight lines that extend in a substantially parallel direction. As used herein, "substantially parallel direction" refers to a deviation of no greater than 5° between the measured directions of two lines, such as no greater than 4°, no greater than 3°, or even no greater than 2°. In a more particular embodiment, the angles 8 can all lie along lines that extend in parallel. As used herein, "extend in parallel" refers to a deviation of no greater than 0.5° between the measured directions of two lines. In this regard, the sidewall segments 6 can each have parallel circumferential end lines.

In a particular embodiment, when viewed from a top view in an installed state, the tolerance ring 2 can comprise a regular polygon, that is, the tolerance ring 2 can be a polygon that may be both equiangular and equilateral. Regular polygons generally have n-fold rotational symmetry, having a number of rotationally symmetric orientations equal to the number of sidewalls thereof. For example, regular triangles have three points of rotational symmetry, regular quadrilaterals have four points of rotational symmetry, regular pentagons have five points of rotational symmetry, and so on. In a particular embodiment, a regular polygon may evenly displace loading conditions around the tolerance ring 2 so as to avoid uneven radial loading conditions and any undesirable eccentric operational effects.

In a particular embodiment, each sidewall segment 6 of buckled regions 35 can be adapted to deflect upon a loading condition, e.g., application of a radially outward force supplied by an inner member. In this regard, each sidewall segment 6 can be adapted to act as a beam. As used herein, the term "beam" refers to the load deflection characteristic exhibited by a beam under normal loading conditions. Whereas traditional tolerance rings may permit the absorption of a tolerance between mating components through elastic or plastic deformation of projecting waves extending from an annular body, the sidewall segments, as described herein, can bend to absorb the tolerance between mating components. In such a manner, the sidewall segments 6 can bend or deflect like a beam under a loading condition.

In the installed state, each sidewall segment 6 of the buckled regions 35 can define an undeformed thickness, $T_{SS}$, as measured by a distance between a radially inner surface of the sidewall segment 6 and a radially outer surface of the sidewall segment 6 at an undeformed location, e.g., a location of the sidewall 104 with a sidewall segment 6 and devoid of a wave structure region 130. In a particular embodiment, the undeformed thickness, $T_{SS}$, of each sidewall segment 6 can be less than a thickness, $T_S$, of a portion of the sidewall 104 with a wave structure region 130, as measured by a distance between a plane formed by the radially inner surface of the sidewall segment 6 and a radially outermost apex of each wave structure region 130, e.g., the maximum distance the wave structure region 130, extends from the surface of the sidewall 104 as measured in a direction perpendicular to the inner surface of the sidewall segment. In a particular embodiment, $T_S$ can be no less than 1.01 $T_{SS}$, such as no less than 1.05 $T_{SS}$, no less than 1.1 $T_{SS}$, no less than 1.15 $T_{SS}$, no less than 1.2 $T_{SS}$, no less than 1.25 $T_{SS}$, no less than 1.3 $T_{SS}$, no less than 1.35 $T_{SS}$, no less than 1.4 $T_{SS}$, or even no less than 1.45 $T_{SS}$. In another embodiment, $T_S$ can be no greater than 6.0 $T_{SS}$, such as no greater than 5 $T_{SS}$, no greater than 4 $T_{SS}$, no greater than 3 $T_{SS}$, no greater than 2 $T_{SS}$, no greater than 1 $T_{SS}$, no greater than 1.75 $T_{SS}$, no greater than 1.7 $T_{SS}$, no greater than 1.65 $T_{SS}$, no greater than 1.6 $T_{SS}$, no greater than 1.55 $T_{SS}$, or even no greater than 1.5 $T_{SS}$. A person of ordinary skill will understand after reading this specification that in particular embodiments, the ratio of $T_S$ to $T_{SS}$ can vary as measured between different wave structure regions 130 or between different sidewall segments 6 or buckling regions 35.

As shown above, in particular embodiments as well as FIGS. 1A-3, at least one wave structure or wave structure region 130 can be used to generate a specific bending characteristic of the sidewall 104. In a number of embodiments, the wave structure or wave structure region 130 may be adapted to alter the stiffness profile of the tolerance ring 2. This may in turn adjust the stiffness of each sidewall segment 6 and may allow for use of the tolerance ring 2 in various different applications.

In a certain embodiment, the wave structure or wave structure region 130 may contain a material that can extend radially from the sidewall 104. In another embodiment, at least one the wave structure or wave structure region 130 can extend from a sidewall segment 6. In yet a further embodiment, a plurality of the wave structures or wave structure regions 130 can extend from each sidewall segment 6.

It is not necessary that each sidewall segment 6 or portion of the sidewall 104 have the same number of wave structures or wave structure regions 130, the same wave structures or wave structure regions 130, or even that all the sidewall segments 6 have a wave structure or wave structure region 130. However, in a particular embodiment, each sidewall segment 6 can have a same number of wave structures or wave structure regions 130. In yet a further embodiment, each sidewall segment 6 can have one or more same shape wave structure or wave structure regions 130 oriented in a same direction relative to the sidewall segment 6.

In a particular embodiment, the wave structure or wave structure region 130 can each include a projection extending from the sidewall segment 6 or portion of the sidewall 104. In a more particular embodiment, the wave structure or wave structure region 130 can be monolithic with the sidewall segment 6 or portion of the sidewall 104, e.g., pressed, punched, or otherwise deformed from a continuous portion of the sidewall segment 6. As used herein, monolithic wave structure or wave structure region 130 are not readily detachable from the sidewall segment 6 or portion of the sidewall 104 and may not have a discrete connection point therewith. In another embodiment, at least one of the wave structures or wave structure regions 130 can be a separate component attached to one or more of the sidewall segments 6 or sidewall 104 by a fastening technique, such as, for example, a fastening element, e.g., a threaded or non-threaded fastener; an adhesive; by mechanical deformation, e.g., crimping or bending; by weld; or by any combination thereof.

In a particular embodiment, each wave structure or wave structure region 130 can extend radially inward toward a central axis 116 of the tolerance ring 2. In another embodiment, each wave structure or wave structure region 130 can extend radially outward away from the central axis 116 of the tolerance ring 2. In yet another embodiment, at least one wave structure or wave structure region 130 can extend radially inward towards the central axis 116 of the tolerance ring 2 and at least one wave structure or wave structure region 130 can extend radially outward away from the central axis 116 of the tolerance ring 2.

In the installed state, the tolerance ring 2 can further define an effective radial thickness, $RT_E$, as measured by a shortest distance between an innermost radial location on the inner member 28 and an outermost radial location on the outer member 30 thereof. In a non-limiting embodiment, such as illustrated in FIG. 1, $RT_E$ can be expressed as a smallest circle on a surface of the inner member 28 that contacts each sidewall segment 6 or sidewall 104 at a single location. A second concentric circle or point of contact with the outer member 30 can contact each sidewall segment 6 or sidewall 104 at opposite axial ends thereof. In third regard, $RT_E$ can be defined as a distance between the smallest circle of contact with inner member 28 and the second concentric circle or point of contact with the outer member 30 in a direction normal to the location of measurement.

In a number of embodiments, as shown in FIG. 2, each sidewall segment 6 of the buckled regions 35 can define a surface area, $SA_{SS}$, when measured in the uninstalled state, and as bound by a height and a length of the sidewall segment 6. The wave structure or wave structure region 130 disposed on or contacting the sidewall segment 6 can define a surface area, $SA_{WS}$, as measured by the total surface area that all of the wave structure or wave structure region 130 on the measured sidewall segment 6 occupy when viewed in a direction normal to an undeformed location of the sidewall segment, e.g., a location devoid of wave structure or wave structure region 130. $SA_{WS}$ can include any portion of the wave structure or wave structure region 130 bound by the sidewall segment 6 that does not lie along a plane formed by the surface of the sidewall segment 6. The surface areas, $SA_{WS}$ and $SA_{SS}$, are to be measured when viewed in a direction normal to the sidewall segment 6 at an undeformed location. It should be understood that for purpose of calculations $SA_{SS}$ can include $SA_{WS}$.

In a particular embodiment, $SA_{SS}$ can be greater than $SA_{WS}$. For example, in a further embodiment, $SA_{WS}$ can be no greater than 0.99 $SA_{SS}$, such as no greater than 0.90 $SA_{SS}$, no greater than 0.85 $SA_{SS}$, no greater than 0.80 $SA_{SS}$, no greater than 0.75 $SA_{SS}$, no greater than 0.70 $SA_{SS}$, no greater than 0.65 $SA_{SS}$, no greater than 0.60 $SA_{SS}$, no greater than 0.55 $SA_{SS}$, no greater than 0.50 $SA_{SS}$, no greater than 0.45 $SA_{SS}$, no greater than 0.40 $SA_{SS}$, no greater than 0.35 $SA_{SS}$, no greater than 0.30 $SA_{SS}$, or even no greater than 0.20 $SA_{SS}$. In yet a further embodiment, $SA_{WS}$ can be no less than 0.01 $SA_{SS}$, such as no less than 0.05 $SA_{SS}$, no less than 0.10 $SA_{SS}$, or even no less than 0.15 $SA_{SS}$. In this regard, in a particular embodiment, the wave structure or wave structure region 130 can take up no less than 1% and no greater than 99% of the normal surface area of each sidewall segment 6 or sidewall 104 overall.

Figure 5:
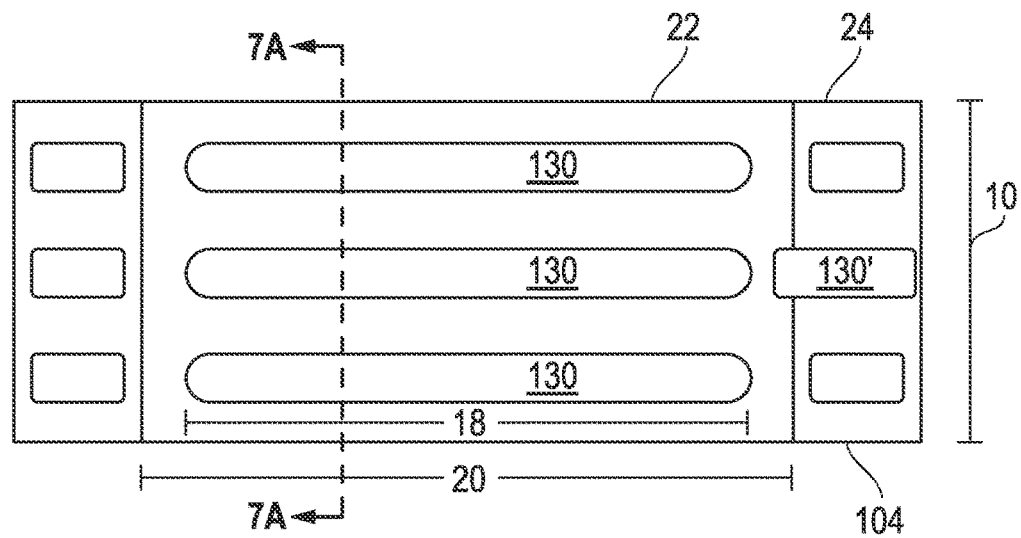
FIG. 5 includes a side elevation view of a tolerance ring in accordance with an embodiment.
Figure 6:
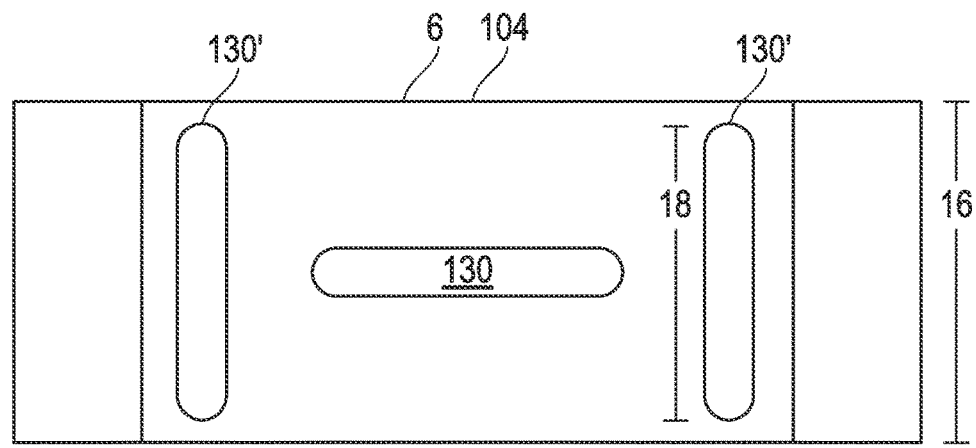
FIG. 6 includes a side elevation view of a tolerance ring in accordance with an embodiment.

In a particular embodiment, at least one wave structure or wave structure region 130 can extend along a line oriented substantially perpendicular to a height, $H_{WS}$ (illustrated in FIG. 6 at 16), of the sidewall segment 6 or sidewall 104 or substantially parallel to a length L of the tolerance ring 2. As used herein, "substantially perpendicular" or "substantially parallel" refers to a deviation of no greater than 5° between the measured directions of two lines, such as no greater than 4°, no greater than 3°, or even no greater than 2°. In a more particular embodiment, at least one wave structure or wave structure region 130 can extend along a line oriented perpendicular to the height, $H_{WS}$, of the sidewall segment 6. As used herein, "oriented perpendicular" or "oriented parallel" refers to a deviation of no greater than 0.5° as measured between the two compared lines. As shown in FIGS. 5-6, the height of the wave structure or wave structure region 130 may be at least 80% of the distance of the effective radial thickness, $RT_E$, such as at least 70%, such as at least 60%, such as at least 50%, such as at least 40%, such as at least 30%, such as at least 20%, such as at least 10%, or such as at least 5%.

In a number of embodiments, the height $H_{WS}$ may be the height of the wave structure or wave structure region 130. In a number of embodiments, during use, the height $H_{WS}$ may be reduced as the wave structures or wave structure regions 130 contact the outer component. As shown in FIGS. 2-3, wave structure or wave structure region 130 may have a wave structure height $H_{WS}$, where upon assembly, may be reduced by no greater than 80%, such as no greater than 70%, such as no greater than 60%, such as no greater than 50%, such as no greater than 40%, such as no greater than 30%, such as no greater than 20%, such as no greater than 10%, or such as no greater than 5%. As shown in FIGS. 2-3, wave structure or wave structure region 130 may have a wave structure height $H_{WS}$, where upon assembly, may be reduced by at least 80%, such as at least 70%, such as at least 60%, such as at least 50%, such as at least 40%, such as at least 30%, such as no greater than 20%, such as at least 10%, or such as at least 5%.

As shown in FIGS. 2-3, during assembly and use, the wave structure height $H_{WS}$ may be reduced to fit between the inner member 28 and the outer member 30. Further, the formation of buckling of the buckled regions 35 may increase the height $H_{BR}$, which may increase the contour of the intermediate regions 119 as they form the buckled regions 35. The height $H_{BR}$ may be increased by no greater than 80%, such as no greater than 70%, such as no greater than 60%, such as no greater than 50%, such as no greater than 40%, such as no greater than 30%, such as no greater than 20%, such as no greater than 10%, or such as no greater than 5%. The height $H_{BR}$ may be increased by at least 80%, such as at least 70%, such as at least 60%, such as at least 50%, such as at least 40%, such as at least 30%, such as no greater than 20%, such as at least 10%, or such as at least 5%. As a result, the wave structure region 130 height $H_{WS}$ may decrease while the buckled region height $H_{BR}$ may increase to form an interface of the tolerance ring 2 between the inner member 28 and outer member 30 of the assembly.

Referring to FIGS. 5-6, each sidewall segment 6 can define a length, $L_{SS}$, (illustrated in FIG. 5 at 20), and each wave structure or wave structure region 130 can define a length, $L_{WS}$ (illustrated in FIG. 5 at 18). In a particular embodiment, $L_{WS}$ can be less than $L_{SS}$. For example, $L_{WS}$ can be no greater than 0.99 $L_{SS}$, such as no greater than 0.95 $L_{SS}$, no greater than 0.90 $L_{SS}$, no greater than 0.85 $L_{SS}$, no greater than 0.75 $L_{SS}$, or even no greater than 0.50 $L_{SS}$. Moreover, $L_{WS}$ can be no less than 0.1 $L_{SS}$, such as no less than 0.25 $L_{SS}$, or even no less than 0.45 $L_{SS}$.

In a particular embodiment, as shown in FIG. 5, at least one wave structure or wave structure region 130 can be positioned on the tolerance ring 2 so as to contact a first sidewall segment 22 and terminate prior to contacting a second sidewall segment 24. In this regard, the at least one wave structure or wave structure region 130 can be disposed on only one sidewall segment 6. In another embodiment, at least one wave structure or wave structure region 130' can extend between adjacent sidewall segments 22 and 24. In such a manner, the one wave structure or wave structure region 130' can transect a junction formed between adjacent sidewall segments 22 and 24 and can extend along at least a portion of each adjacent sidewall segment 22 and 24. In a further embodiment, multiple wave structures or wave structure regions 130 can transect the junction between adjacent sidewall segments 22 and 24.

In yet another embodiment, such as, for example, illustrated in FIG. 6, at least one wave structure or wave structure region 130' can extend along a line oriented substantially parallel to a height 16 of the sidewall segment 6 or sidewall 104 or substantially perpendicular to a length L of the tolerance ring 2. In a particular embodiment, the length of the wave structure or wave structure region 130', $L_{WS}$ (illustrated in FIG. 6 at 18) can be less than the height of the sidewall segment, $H_{SS}$ (illustrated in FIG. 6 at 16). For example, $L_{WS}$ can be no greater than 0.99 $H_{SS}$, such as no greater than 0.95 $H_{SS}$, no greater than 0.90 $H_{SS}$, no greater than 0.85 $H_{SS}$, no greater than 0.75 $H_{SS}$, or even no greater than 0.50 $H_{SS}$. Moreover, $L_{WS}$ can be no less than 0.1 $H_{SS}$, such as no less than 0.25 $H_{SS}$, or even no less than 0.45 $H_{SS}$.

In a particular embodiment, the wave structure or wave structure region 130, 130' can all be oriented in different directions relative to each other. For example, as illustrated in FIG. 6, a central wave structure region 130 can extend in a direction perpendicular to the height 16 of the sidewall segment 6, while one or more outer wave structure regions 130' can extend in a direction parallel to the height 16 of the sidewall segment 6. Moreover, it should be understood that the scope of the disclosure is not intended to be limited by this exemplary embodiment. A person of ordinary skill in the art will understand that the wave structures or wave structure regions 130' can be arranged on each sidewall segment 6 or sidewall 104 in various arrangements and configurations, having various dimensions, characteristics, orientations, and properties as described herein.

Figure 7A:
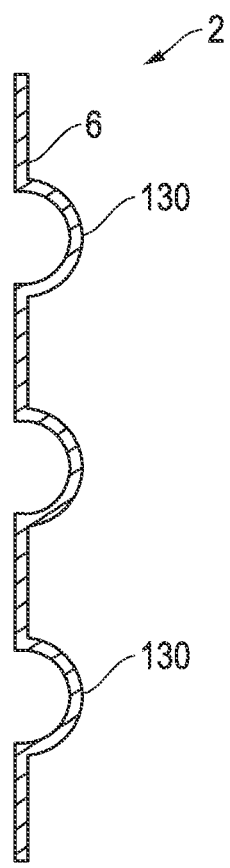
FIGS. 7A and 7B includes cross-sectional side views of tolerance rings in accordance with embodiments described herein, as seen along Line A-A in FIG. 5.
Figure 7B:
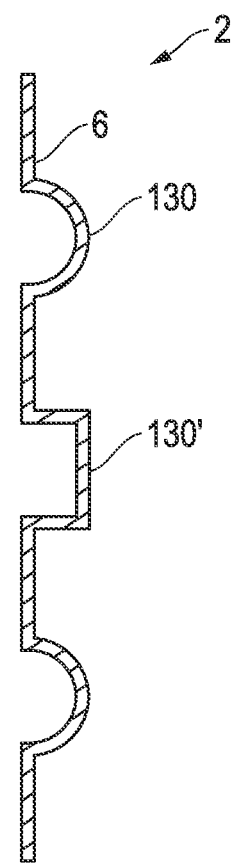
Figure 8:
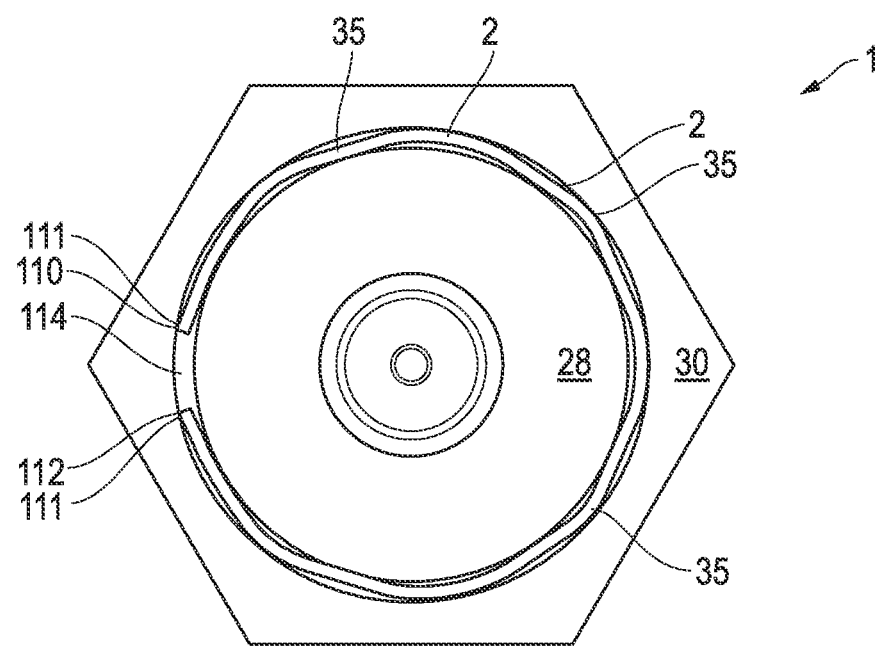
FIG. 8 includes a top view of a tolerance ring within an assembly in accordance with an embodiment.

Referring now to FIGS. 7A and 7B, in a particular embodiment, at least a portion of at least one wave structure or wave structure region 130 can have an arcuate contour when viewed in cross-section (FIG. 7A). In another embodiment, at least a portion of at least one wave structure or wave structure region 130' can have a polygonal contour when viewed in cross-section (FIG. 7B). The polygonal contour can include, for example, a triangular contour, a quadrilateral contour (as illustrated as the central wave structure or wave structure region 130' in FIG. 4B), a pentagonal contour, a hexagonal contour, a heptagonal contour, or even an octagonal contour. As illustrated in FIG. 7B, in a particular embodiment, the wave structure or wave structure regions 130, 130' disposed on each sidewall segment 6 can have a different or unique contour when viewed in cross section. Additionally, each wave structure or wave structure region 103, 130' can have an arcuate contoured portion and a polygonal contoured portion. In such a manner, the wave structure or wave structure regions 130' can be varied and altered for specific applications. As stated above the wave structure or wave structure region 103, 130' may have a pointed apex 131.

During and after assembly, at least one of the wave structure or wave structure regions 130 can operate in an elastic zone of deformation, i.e., the at least one wave structure or wave structure region 130 can be capable of deforming upon application of a force and returning to its original shape after removal of the force. In a further embodiment, at least one of the wave structure or wave structure regions 130 can operate in a plastic zone of deformation, i.e., the at least one wave structure or wave structure region 130 can be incapable of fully returning to its original shape after removal the force. It may be possible, by including wave structures 130 of different deformation characteristics on a single sidewall segment 6 or sidewall 104, to yet further alter the characteristics of the tolerance ring 2, e.g., stiffness, sliding capability, or tolerance absorption.

A tolerance ring 2 in accordance with one or more of the embodiments described herein can have a buckled region 35 with a sidewall segment 6 stiffness (an indicator of the sidewall segments resistance to deformation under load) which may be at least 1% greater than a same tolerance ring 2 devoid of a wave structure or wave structure region 130, such as at least 5% greater than a same tolerance ring devoid of a wave structure or wave structure region 130, at least 10% greater than a same tolerance ring devoid of a wave structure or wave structure region 130, or even at least 20% wave structure or wave structure region 130 as compared to a same tolerance ring devoid of a wave structure or wave structure region 130. In this regard, it may be possible for a tolerance ring 2 in accordance with embodiments herein to span a large radial gap 105 between an inner and outer member without substantially altering radial strength or slip characteristics of the tolerance ring 2. As used herein, "span" refers to contact between the tolerance ring 2 and both the inner and outer members. More particularly, "span" can refer to a degree of contact that allows for transmission of force between the inner and outer members.

In a further embodiment, the tolerance ring 2 can further define at least one aperture extending through a portion of the sidewall 104. The aperture can be disposed along the sidewall 104 along an undeformed portion 119 or buckled region 35 thereof, along one or more of the wave structure or wave structure regions 130, or along a combination thereof. In this regard, the sidewall segment stiffness can be further altered and adjusted for particular applications. For example, a sidewall segment 6 having a central aperture may have a lower stiffness, making the sidewall segment 6 more likely bend to absorb tolerances and deflect upon loading conditions.

In an embodiment, when a diameter of the inner member 28 may be less than 30 mm, the tolerance ring 2 can span a radial gap 105 having a radial distance of at least 1% of the diameter of the inner member, such as at least 5% of the diameter, at least 10% of the diameter, or even at least 25% of the diameter. As used herein, "radial distance" refers to a shortest distance between coaxial inner and outer members. In another embodiment, when the diameter of the inner member 28 may be at least 30 mm, the tolerance ring 2 can span a radial gap 105 having a radial distance of at least 0.5 mm, such as at least 1 mm, at least 1.5 mm, at least 3 mm, at least 4 mm, at least 5 mm, or even at least 10 mm. In a further embodiment, the tolerance ring 2 can span a radial gap 105 having a radial distance of no greater than 250 mm, such as no greater than 200 mm, no greater than 100 mm, or even no greater than 50 mm.

In accordance with an embodiment described herein, the tolerance ring 2 can have the plurality of sidewall segments 6 formed from the buckling of the buckled regions 35. Each sidewall segment 6 can contact an outer surface 210 of the inner member 28 so as to form at least one point of contact with the inner member 28. In a more particular embodiment, the point of contact between the tolerance ring 2 and the inner member 28 can occur at a middle portion 214 of each sidewall segment 6. In a particular embodiment, the point of contact between the inner member 28 and the middle portion 214 of each sidewall segment 6 can be a point or line contact, e.g., contact formed along a single point or along a single line. Alternatively, the point of contact can be an area contact, e.g., contact formed at an area as measured in a direction parallel to both the length and the height of each sidewall segment 6.

In a further embodiment, each sidewall segment 6 of the buckled regions 35 can contact an inner surface 212 of the outer member 30 so as to form at least one point of contact with the outer member 30. In a more particular embodiment, the point of contact between the tolerance ring 2 and the outer member 30 can occur at opposite apexes 7, 7' of the buckled regions 35 at each sidewall segment 6. In this regard, it may be possible for each sidewall segment 6 to form three contact points between the inner and outer members 28 and 30—two supporting contact points at apexes 7, 7', and a loaded contact point at the middle portion 214.

The radial gap 105 can define an inner radius, IR, as defined by the outer surface 210 of the inner member 28, and an outer radius, OR, as defined by the inner surface 212 of the outer member 30. The radial gap 105 can have a radial thickness, $T_{AG}$, as measured by a difference between OR and IR. A radial gap aspect ratio can be defined by a ratio of IR/OR.

In a number of embodiments, several design features may be included in the tolerance ring 2 to enhance buckled of the buckled regions 35 during installation and use of the assembly 1. In a number of embodiments, the wave structures apexes 131 may be pointed to promote additional interlocking between the tolerance ring 2 and at least one of the inner component 2 or outer component 30 in the assembly. In a number of embodiments, inner radius $IR_{TR}$ of the tolerance ring 2 may be manufactured to be just larger than the inner radius IR defined by the outer surface 210 of the inner member 28 in an uninstalled state. In this way, the buckling of the buckled regions 35 may be encouraged during installation as the outer member 30 may be pressed over the tolerance ring 2 to provide an interference fit during installation of the assembly 1. In a number of embodiments, the buckled regions 35 and the wave structure regions 130 may be made of different materials or have different material compositions from the materials listed above such that the buckling of the buckled regions 35 may be encouraged during installation or use within the assembly 1.

In a number of embodiments, at least one intermediate region 119 (or buckled region 35) may have a radius that may be different than a radius of at least one non-buckled region (wave structure region 130) of the tolerance ring 2. In a number of embodiments, the inner radius $IR_{TR}$ of the tolerance ring 2 may be modified along its circumference to promote buckling of the buckled regions 35 may be encouraged during installation or use within the assembly 1. For example, the inner radius of the buckling regions 35 $IR_{TRBR}$ may be smaller in size than the radius of the wave structure regions 130 $IR_{TRWS}$ along the circumference of the tolerance ring 2. Alternatively, the inner radius of the buckling regions 35 $IR_{TRBR}$ may be larger in size than the radius of the wave structure regions 130 $IR_{TRWS}$ along the circumference of the tolerance ring 2. In a number of embodiments, a portion of the tolerance ring 2 (such as the wave structure region 130) may have a different radius of curvature than a different portion of the tolerance ring 2 (such as the buckled region 35). In a number of embodiments, at least one of the waves structure regions 130 or the buckled regions 35 can have a radius of curvature that may be similar to inner radius IR defined by the outer surface 210 of the inner member 28. For example, the radius of curvature of at least one of the waves structure regions 130 or the buckled regions 35 can be within 10% of the inner radius IR defined by the outer surface 210 of the inner member 28, such as within 5%, within 4%, or even within 3%. In a more specific embodiment, the wave structure regions 130 may have a smaller radius of curvature than the overall inner radius $IR_{TR}$ of the tolerance ring 2. In a number of embodiments, the arc length of the buckling regions 35 $AL_{BR}$ may be smaller in size than the arc length of the wave structure regions 130 $AL_{WS}$ along the circumference of the tolerance ring 2. Alternatively, the arc length of the buckling regions 35 $AL_{BR}$ may be larger in size than the arc length of the wave structure regions 130 $AL_{WS}$ along the circumference of the tolerance ring 2. Any one of the design features may be used to promote buckling of the buckled regions 35 on the tolerance ring 2 during installation or use within the assembly 1.

A person of ordinary skill in the art will understand after reading the entire specification that the number of sidewall segments 6 necessary to span a radial gap 108 can vary based on several variables, such as, for example, the radial gap aspect ratio, the thicknesses, $T_{SS}$ and $T_{WS}$, of the sidewall segments 6, and the desired loading forces, e.g., the slip characteristic, the minimum and maximum allowed radial forces, and the acceptable bending condition of each sidewall segment 6. In this regard, a first step in determining the number of sidewall segments 6 for a particular radial gap aspect ratio can include calculating a theoretical number of sidewall segments using the following equation:

$$n = \frac{180}{\cos^{-1}\left(\frac{IR}{OR}\right)} \quad \text{(Equation 1)}$$

where n represents a theoretical number of sidewall segments 6 formed from buckled regions 35 necessary for the tolerance ring 2 to perfectly, or nearly perfectly, fit in the radial gap 105, and where IR/OR is the radial gap aspect ratio. Using equation 1, it may be possible to determine an appropriate number of sidewall segments 6 in an unloaded, or unbent, tolerance ring configuration (such as illustrated in FIG. 5). For example, using equation 1, an inner member 28 having a diameter of 8 mm disposed within an outer member 30 having a bore 204 with a diameter of 16 mm can perfectly, or nearly perfectly, fit a tolerance ring having 3 sidewall segments 6 (or buckled regions 35) without deforming any portion of the tolerance ring 2. Likewise, an inner member 28 having a diameter of 10 mm disposed within an outer member 30 having a bore 204 with a diameter of 14.142 mm can perfectly, or nearly perfectly, fit a tolerance ring having 4 sidewall segments 6 (or buckled regions 35) without deforming any portion of the tolerance ring 2. As used herein, "perfectly fit" refers to a size ratio between two objects as 1:1. More specifically, as used herein "perfectly fit" can refer to a 1:1 ratio of the effective radial thickness of a tolerance ring, $RT_E$, to $T_{AG}$. In other words, a perfectly fit tolerance ring can be disposed between inner and outer members with the tolerance ring exhibiting no deflection or loading forces, while each sidewall segment can simultaneously form three points of contact with the inner and outer members—two points of contact with the outer member and one point of contact with the inner member. As used herein, "nearly perfectly fit" refers to a deviation from a 1:1 ratio between the effective radial thickness and $T_{AG}$ by less than 5%, such as by less than 4%, less than 3%, less than 2%, or even less than 1%. A person of ordinary skill in the art will understand that equation 1 can be adjusted to account for the thickness of the sidewall segments 6.

In applications where n is not a whole number, e.g., an inner member 28 having a diameter of 20 mm disposed within an outer member 30 having a bore 204 with a diameter of 26 mm requires use of a tolerance ring having 4.533 sidewall segments 6, it may be necessary to adjust the tolerance ring 2 in one of several ways.

Because the number of sidewall segments 6 required in the last example is between 4.0 and 5.0 it may be acceptable, depending on the application, to utilize a tolerance ring 2 having either 4 or 5 sidewall segments. By rounding to the nearest whole number of sidewall segments, e.g., to 4 or five equilateral sidewall segments, an unbalanced radial load may be avoided. In a particular embodiment, it may be advantageous to utilize the lower number of sidewall segments, thereby increasing the circumferential size of the axial gap.

After the number of sidewall segments 6 necessary for an unloaded, e.g., undeformed tolerance ring, has been determined using equation 1, radial stiffness, slip characteristics, loading conditions, and other application specific modifications can be made to the tolerance ring 2 by adjusting the number, shape, and size of the sidewall segments 6, the wave structures 130, and any other features of the tolerance ring 2. For example, in a non-limiting embodiment, a radial gap 105 having a radial gap aspect ratio of $\sqrt{2}$ can perfectly fit, without loading characteristics, a tolerance ring 2 having four sidewall segments 6, e.g., a quadrilateral tolerance ring. Disposing a tolerance ring 2 having three sidewall segments 6 within said radial gap may permit a radial loading between the inner member, the tolerance ring, and the outer member, thereby altering the characteristics of the assembly.

Similarly, in another, non-limiting embodiment, a radial gap 105 having a radial gap aspect ratio of approximately 1.2361 can nearly perfectly fit, without loading characteristics, a tolerance ring 2 having five sidewall segments 6, e.g., a pentagonal tolerance ring. Disposing a partial sidewall segment 120 between each of the adjacent sidewall segments 6 of the pentagonal tolerance ring, can permit a radial loading between the inner member, the tolerance ring, and the outer member, thereby altering the characteristics of the assembly.

In an embodiment, the assembly 1 can be installed or assembled by an assembly force of at least 1 kgf in a longitudinal direction relative to the shaft 4 or housing 8, such as at least 2 kgf, at least 3 kgf, at least 4 kgf, at least 5 kgf, at least 10 kgf, or even at least 15 kgf. In a further embodiment, the torque assembly 1 can be installed or assembled by an assembly force of no greater than 200 kg in a longitudinal direction to the housing 8, such as no greater than 150 kgf, no greater than 100 kgf, no greater than 75 kgf, or even no greater than 25 kgf.

In an embodiment, the assembly 1 may be tightened to provide a required torque value of about 1 N■m to about 20 N■m with a nominal +/−10% variation over the lifetime of the tolerance ring 1.

Use of the tolerance ring 2 or assembly 1 may provide increased benefits in several applications such as, but not limited to, vehicle tail gates, door frames, seat assemblies, or other types of applications. Notably, the use of the tolerance ring may provide an overload protection device that will provide a consistent torque of nominal +/−10% variation over the lifetime of the tolerance ring 1. This may provide for an appropriate slip within the assembly at predetermined torque values which does not marginally change over time, for the reasons and through the features stated herein. The tolerance ring 2 may run within an assembly 2 in a cycle of not more than 10 cycles.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. A assembly comprising: an outer member; an inner member; and a tolerance ring disposed between the inner member and the outer member, wherein the tolerance ring comprises a split ring having opposing edges, wherein the edges are engaged with one of the inner member or the outer member so as to prevent or restrict relative movement between the tolerance ring and at least one of the inner member or the outer member.

Embodiment 2. A assembly comprising: an outer member; an inner member; and a tolerance ring disposed between the inner member and the outer member, wherein the tolerance ring is deformed as installed between the inner member and the outer member and forms at least one buckled region in the tolerance ring due to an interference fit between the inner member and the outer member, wherein in an uninstalled state, the buckled region is absent.

Embodiment 3. The assembly of embodiment 1, wherein the edges form an interlock caused by a corner of at least one of the edges contacting at least one of the inner member or the outer member.

Embodiment 4. The assembly of any of embodiments 1 and 3, wherein the edges are engaged to the inner member.

Embodiment 5. The assembly of any of embodiments 1 and 3-4, wherein the edges are engaged to the outer member.

Embodiment 6. The assembly of embodiment 2, wherein the buckled region is at least partially elastically formed, such that upon disassembly the buckled region at least partially collapses.

Embodiment 7. The assembly of any of embodiments 2 and 6, wherein the buckled region has a buckled region height $H_{BR}$, wherein upon disassembly $H_{BR}$ is reduced by at least 50%.

Embodiment 8. The assembly of any of embodiments 2 and 6-7, wherein the buckled region contacts the outer member.

Embodiment 9. The assembly any of embodiments 2 and 6-8, wherein in an uninstalled state, the tolerance ring comprises a plurality of wave structure regions spaced circumferentially around the tolerance ring, and a plurality of intermediate regions disposed between the wave structure regions, and wherein at least one intermediate region is deformed upon assembly to form the buckled region in an installed state.

Embodiment 10. The assembly of any of the preceding embodiments, wherein at least one of the inner member or the outer member is capable of rotational, axial, or radial movement.

Embodiment 11. The assembly of embodiment 10, wherein the low friction layer comprises a polymer.

Embodiment 12. The assembly of any of the preceding embodiments, wherein at least one of the outer member is capable of rotational, axial, or radial movement.

Embodiment 13. The assembly of any of embodiments 9-12, wherein at least one wave structure region has a rounded apex.

Embodiment 14. The assembly of any of embodiments 9-13, wherein the wave structure region comprises at least one wave structure oriented substantially perpendicular to the length of the tolerance ring.

Embodiment 15. The assembly of any of embodiments 9-14, wherein the wave structure region comprises at least one wave structure oriented substantially parallel to the length of the tolerance ring.

Embodiment 16. The assembly of any of embodiments 9-15, wherein a portion of the intermediate region is contoured in an uninstalled state.

Embodiment 17. The assembly of any of embodiments 9-16, wherein at least one buckled region deforms outward while at least one wave structure region deforms inward in an installed state.

Embodiment 18. The assembly of any of the preceding embodiments, wherein at least one buckled region is adapted to form one point of contact with the outer component.

Embodiment 19. The assembly of any of the preceding embodiments, wherein a portion of the tolerance ring has a different radius of curvature than a different portion of the tolerance ring.

Embodiment 20. The assembly of any of embodiments 9-19, wherein at least one intermediate region has a radius of curvature that is different than a radius of curvature of at least one wave structure region of the tolerance ring.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:

1. An assembly comprising:
an outer member;
an inner member; and
a tolerance ring disposed between the inner member and the outer member, wherein the tolerance ring comprises a split ring having opposing circumferential edges, wherein the circumferential edges are directly engaged with one of the inner member or the outer member so as to prevent or restrict relative movement between the tolerance ring and at least one of the inner member or the outer member, and wherein the tolerance ring comprises a plurality of planar sidewall segments, wherein at least one of the outer member or the inner member comprises a groove and at least one of the circumferential edges of the tolerance ring is keyed to match the groove.

2. The assembly of claim 1, wherein the edges form an interlock caused by a corner of at least one of the edges contacting at least one of the inner member or the outer member.

3. The assembly of claim 1, wherein the edges are engaged to the inner member.

4. The assembly of claim 1, wherein the edges are engaged to the outer member.

5. The assembly of claim 1, wherein the tolerance ring further comprises a substrate and a low friction layer.

6. The assembly of claim 5, wherein the low friction layer comprises a polymer.

7. The assembly of claim 5, wherein the low friction layer comprises a polytetrafluoroethylene.

8. The assembly of claim 1, wherein at least one of the inner member or the outer member is capable of rotational, axial, or radial movement.

9. The assembly of claim 1, wherein the tolerance ring has a thickness greater than 0.1 mm and less than 1 mm.

10. The assembly of claim 1, wherein the tolerance ring has an outer diameter greater than 1 mm and less than 100 mm.

11. The assembly of claim 1, wherein the tolerance ring has a length greater than 1 mm and less than 75 mm.

12. The assembly of claim 1, wherein the tolerance ring further comprises a sidewall and a plurality of wave structure regions protruding radially outward or inward from the sidewall.

13. The assembly of claim 12, wherein at least one of the plurality of wave structure regions comprises a projection.

14. The assembly of claim 12, wherein at least one of the plurality of wave structure regions has an arcuate contour.

15. The assembly of claim 12, wherein at least one of the plurality of wave structure regions has a polygonal contour.

16. The assembly of claim 1, wherein the assembly is tightened to provide a required torque value of about 1 Nm to about 20 Nm with a nominal+/−10% variation over the lifetime of the tolerance ring.

17. The assembly of claim 1, wherein the groove has polygonal, oval, circular, semi-circular, or substantially circular cross-section.

18. The assembly of claim 1, wherein the inner member comprises a groove and at least one of the edges of the tolerance ring is keyed to match the groove.

19. The assembly of claim 18, wherein the groove has polygonal, oval, circular, semi-circular, or substantially circular cross-section.

* * * * *